E. D. BROTHERS.
DRIVING MECHANISM.
APPLICATION FILED FEB. 16, 1911.

1,044,129.    Patented Nov. 12, 1912.
3 SHEETS—SHEET 1.

Witnesses:
Robert H. Weir
Charles I. Cobb

Inventor:
Elmer D. Brothers
By Hill & Hill
Attys.

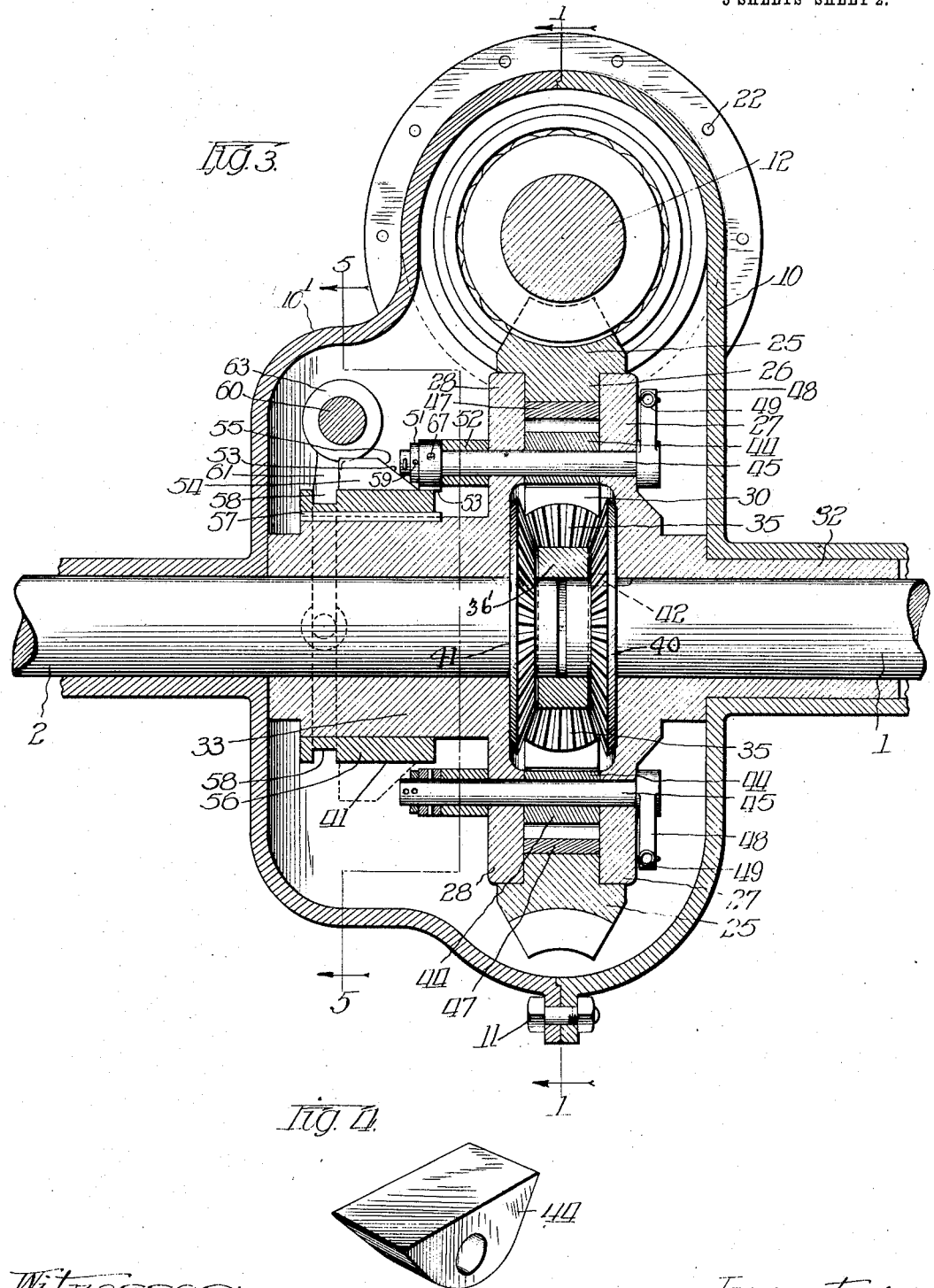

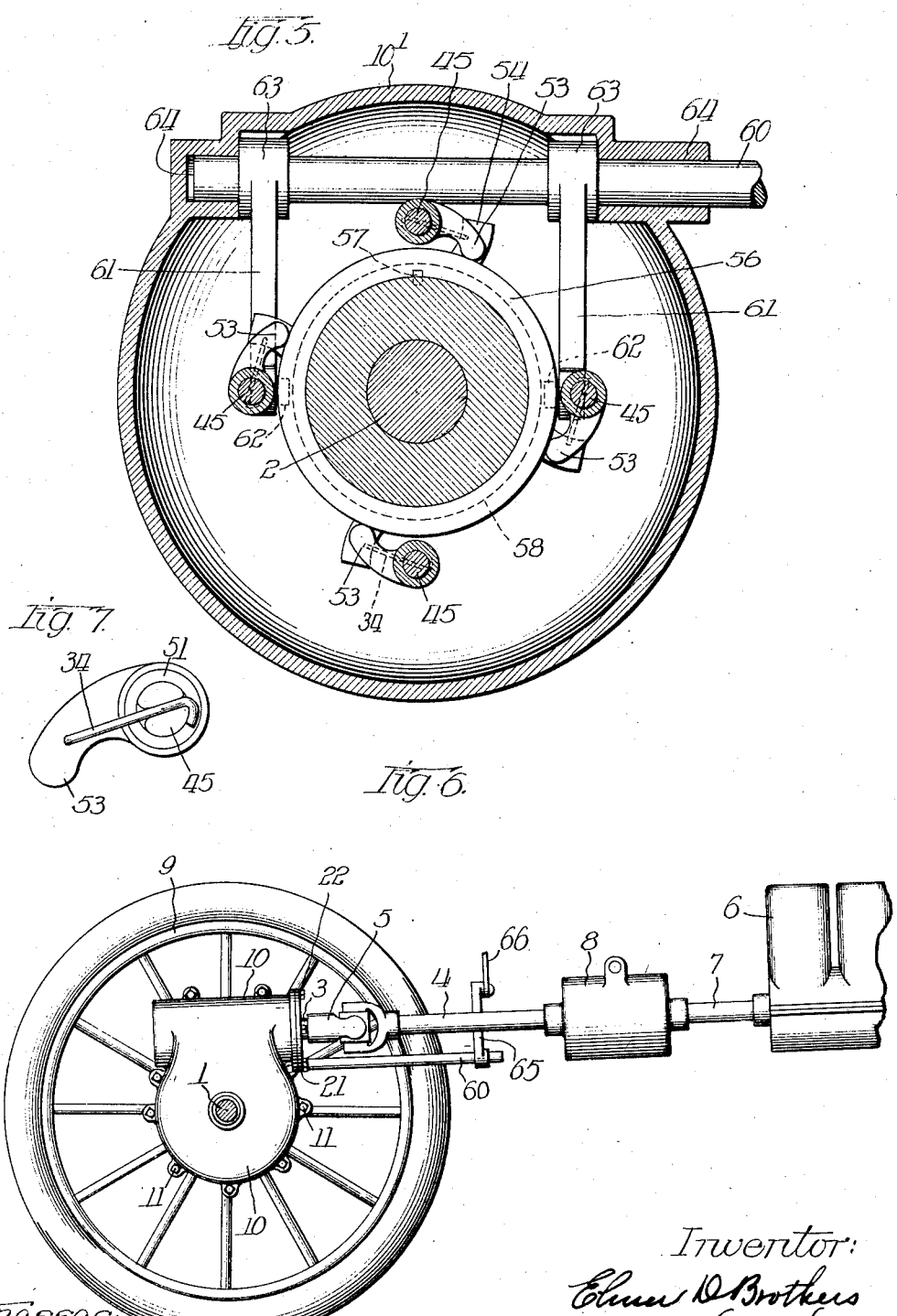

UNITED STATES PATENT OFFICE.

ELMER D. BROTHERS, OF CHICAGO, ILLINOIS.

DRIVING MECHANISM.

1,044,129.  Specification of Letters Patent.  Patented Nov. 12, 1912.

Application filed February 16, 1911. Serial No. 608,914.

*To all whom it may concern:*

Be it known that I, ELMER D. BROTHERS, a citizen of the United States, residing at Chicago, in the county of Cook and State of Illinois, have invented certain new and useful Improvements in Driving Mechanisms, of which the following is a description.

My invention belongs to that general class of devices known as driving mechanisms, and particularly relates to a power transmission gearing for use wherever found applicable.

The device is particularly applicable for power transmission on vehicles, such as trucks, traction engines, agricultural machinery or the like, designed for heavy duty, where power rather than high speed is desirable, but the same is applicable for railway cars and other uses.

My invention has among its objects the production of a simple, durable, efficient, powerful, positive and satisfactory driving mechanism of the kind described.

To this end my invention consists in the novel construction, arrangement and combination of parts herein shown and described, and more particularly pointed out in the claims.

Figure 1:
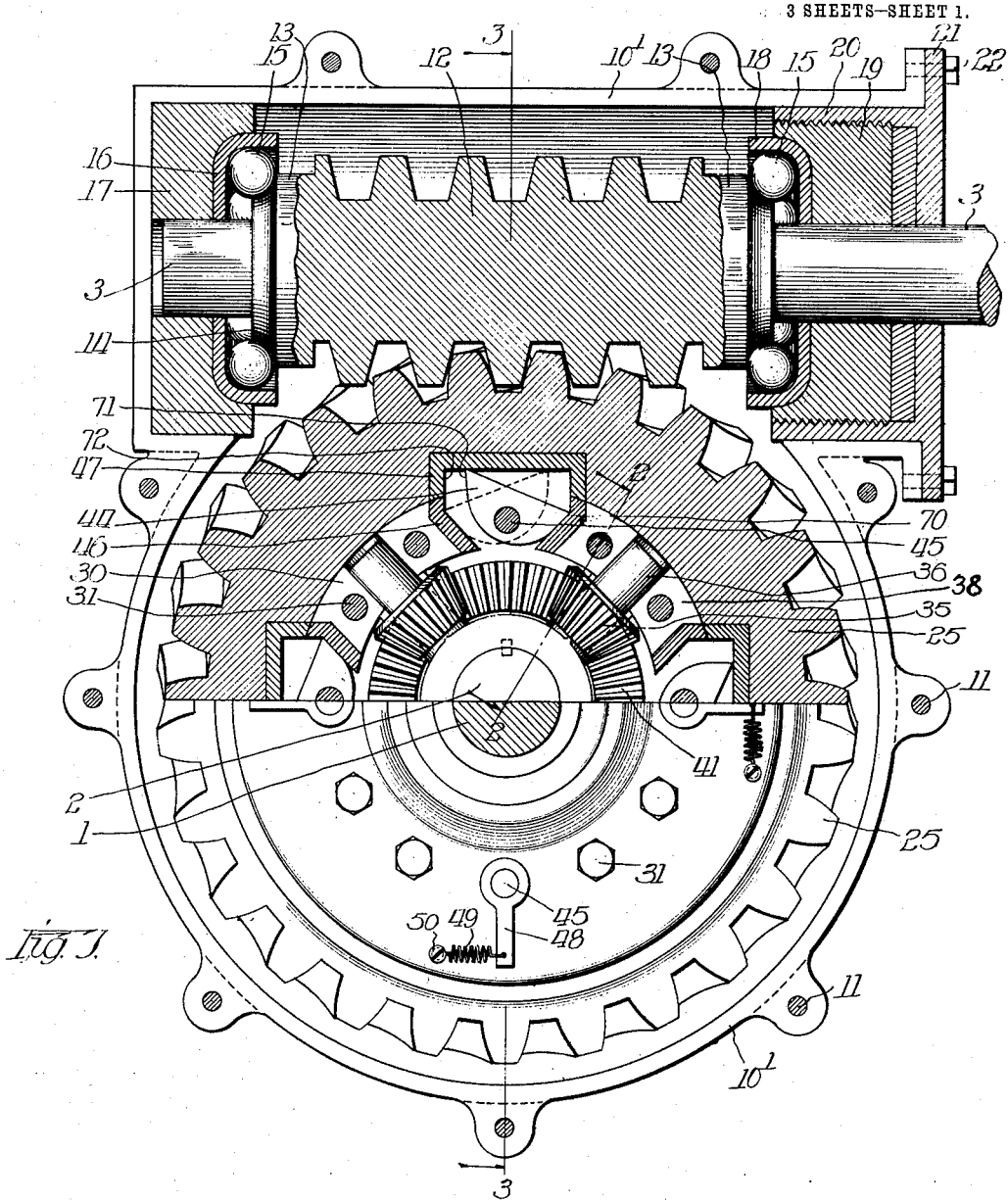
Figure 2:
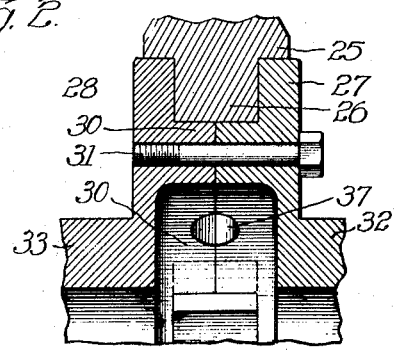

In the drawings, wherein like reference characters indicate like or corresponding parts: Figure 1 is a sectional view of my device taken substantially on line 1, 1 of Fig. 3. Fig. 2 is a sectional view taken substantially on line 2, 2 of Fig. 1. Fig. 3 is a sectional view taken substantially on line 3, 3 of Fig. 1. Fig. 4 is a perspective view of one of the parts. Fig. 5 is a sectional view taken substantially on line 5, 5 of Fig. 3. Fig. 6 is a side elevation of the device inclosed in its casing, together with the engine and transmission gear and the driving shaft. Fig. 7 is a detail view of one of the fingers.

Referring to the drawings, 1 and 2 (see Fig. 3) represent the vehicle axle or the driven shaft, the same being in a plurality of parts, as shown two parts, and 3 represents the driving shaft. Each part of the axle is connected to one of the wheels of the vehicle so that the vehicle is propelled by the driving axle. It should be distinctly understood, however, that the axle may be a separate shaft, and the wheels or axle suitably connected with the shaft parts 1 and 2. The driving shaft 3 is connected to any suitable source of power, as shown to an internal combustion engine 6 through the shaft members 4 and 7 a universal joint or coupling 5 and a suitable transmission gear 8, it being understood that the driving mechanism hereafter described is not intended to take the place of the usual transmission gearing, as it is commonly known, although its use is not limited to the combination with transmission gearing. The body and frame of the vehicle and other parts which do not form a part of the present invention are not shown, as the same are unnecessary for a complete understanding of the device.

The mechanism is preferably inclosed in a suitable casing 10 and $10^1$, made in a plurality of parts and of suitable material and shape, which may be secured together by means of bolts 11, 11, etc., or their equivalents for the purpose. The shaft 3 is provided with or operatively connected with a worm or worm gear part 12 (see Fig. 1) of single or multiple thread and of suitable proportions and material, the same being supported in any preferred way. As shown, the ends of the worm 12 are arranged as at 13, 13, and provided with bearing ends 14 arranged to coöperate with ball bearings 15, or their equivalents. A coöperating bearing part 16 arranged in the part 17 supports the end of the worm gear and takes the thrust at that end, while the bearings at the opposite end coöperate with the bearing 18, which is arranged in the part 19, which part is secured in a removable part 20 flanged at 21 and secured to the casing 10, $10^1$.

The worm 12 meshes with the worm gear or wheel 25, the same being of the desired size or proportions, and preferably extended on the interior as at 26, as hereafter described. The worm wheel 25 is supported by the members 27 and 28, which are extended as at 32 and 33 respectively and loosely mounted on the shaft or axle members 1 and 2. The parts 27 and 28 may be secured together by bolts 31, or their equivalents, and between the parts are parts 30, which may be integral with one or the other of the parts 27 and 28, or separate therefrom, or made up of parts integral with each of the parts 27 and 28. As shown, parts 30 are made up of parts integral with each of the parts 27 and 28. Arranged between the parts 27 and 28 is what may be termed a spider 38 provided with pins 36, which extend into holes 37 formed in the parts 30. On the pins 36 are mounted pinions 35, which seat or bear against the bosses 36¹. The pinions 35 are arranged to mesh with the beveled gears 40 and 41, arranged on each side within the parts 27 and 28. The gears 40 and 41 are suitably secured to the shaft parts 1 and 2 respectively by means of keys 42 and 43 or their equivalents, the pinions and gears forming a part of a differential gearing, so that the shaft or axle parts 1 and 2 are driven through the differential. As is obvious, the differential gearing may be omitted if desired.

Between the parts 30 (see Figs. 1, 3 and 4) are arranged a plurality of worm wheel engaging members or pawls 44, the same being pivotally mounted and controlled by shafts or the pins 45 preferably extending to the exterior of the parts 27 and 28. The pawls 44 serve as a means for connecting the worm wheel 25 and the members 27, 28 and 30, so that as the worm wheel is driven by the worm gear 12, the axle is driven through the differential gearing. Preferably inserted in the parts 30 are hardened inserts or members 46, the same being secured in position in any suitable manner. These parts are so formed that the pawls or members 44 are double acting or will coöperate or contact with one side or the other when turned into the positions indicated by the full and dotted lines in Fig. 1. When the members are intermediate the positions shown they are in neutral position, and the worm wheel is free to rotate when driven by the worm wheel 12 without driving the axle, or the axle may be rotated without rotating the worm wheel. The worm wheel is also provided with an insert 47 in the part 26 for each engaging member 44, the inserts forming substantially ratchet teeth, the same being also hardened so as to stand wear. It is of course understood that in place of the inserts or parts shown the worm wheel and parts may be suitably hardened at those points in order to prevent excessive wear, but by making them in the form of removable inserts, any of them may be removed when worn, as may the members 44, so that repairs on account of wear may be made at slight expense, and without difficulty. As shown in Fig. 1, when the members 44 are in the positions indicated by the full lines, the vehicle will be driven ahead, and when in the positions indicated by the dotted lines, the vehicle will be driven rearward, it being understood of course that in this case the shaft 3 is driven or rotated in the required direction, either forward or backward. When the members 44 are in neutral or intermediate positions the axle will not be driven, regardless of whether or not the shaft 3, worm 12 and worm wheel 25 are driven, or the vehicle may be moved by independent or outside power. This will be more clearly understood by referring to description of the operation of the device.

The members 44 may be controlled in any desired way. As shown, each of the shafts 45 extends to the exterior of the members 27 and 28, as heretofore mentioned, and on the one end of each is secured an arm 48, which is resiliently maintained in position so as to normally keep the members 44 in the position to be engaged, or driving ahead position, by a spring 49 secured to a screw or extension 50 or the equivalent on the part 27. It is of course obvious that the arrangement may be such that the members 44 may be maintained in neutral position, or in the reverse as the case may be, if desired, the drawings showing merely one arrangement for the purpose of illustration. The opposite end of each of the members 45 is provided with a finger 53, or the equivalent for the purpose, the fingers being operated by cams 54, or their equivalent, which may be mounted upon a collar or sleeve 56. The fingers 53 may be secured upon the shafts 45 in any suitable way. As shown, 52 is a collar arranged on the shaft 45 so as to space the finger from the member 28, and 51 is a collar arranged on the outside and secured on the shaft 44 by means of a pin 59 or its equivalent. The fingers are resiliently secured to their respective shafts 45 by springs 34 of the desired stiffness. A pin 67 secured to the shaft 45 extends out through a slot 68 in the finger and acts as a stop for the finger so as to limit its movement under the pressure of its spring 34. The spring is preferably of such strength that operating the finger will operate the shaft 45, and consequently operate the member 44. However, under certain circumstances, as hereafter described, if the shaft 45 is not free to rotate and the fingers are raised, they will work against the pressure of the spring, or, that is, give somewhat relative to the shaft 45, the stiffness of the spring 34 being enough greater than the tension of spring 49 so as to place the pawl 44 in neutral or rearward position when the cams 54 are set for the said positions. At the same time the fingers 53 can be placed in neutral or rearward position on the cams 54, regardless of the position of the inserts 46 and 47. The extensions 54 are provided with cam faces 55 (see Fig. 3) so that as the sleeve or collar 56 is moved in or out relative to the member 28, the fingers 53 will be raised, or under the action of the springs 49, be retrieved. When the sleeve 56 is in position so that the fingers are raised the required or predetermined distance by the cam faces, the shafts 45 will be turned so as to bring the members 44 to neutral position, and when the fingers are upon the top or raised further by the cams, the members 44 will be in position for driving rearward. It is of course obvious that the fingers may be reversed and the cams so arranged that when the fingers are on the top the members 44 will be in the reverse position from that shown, and vice versa, in which case of course the springs 49 should also be changed.

The sleeve 56 is prevented from rotating about the extension 33 by means of one or more keys 57, or their equivalents for the purpose. Any suitable mechanism may be employed to operate the sleeve 56 so as to control the fingers 53. A very simple mechanism for doing this consists of a rotatable rod 60 provided with means for engaging the sleeve, as shown, with a pair of arms or levers 61. The arms 61 are each provided with an extension 62, which extends into a groove 58 in the sleeve, it being understood of course that the sleeve 56, on account of the feather 57, rotates with the extension 33 when the members 27 and 28 are driven. The rod 60 may be rotated or operated in any desired way. As shown, an arm 65 is secured thereon, to which is connected a rod 66 (see Fig. 6) which may be connected to any suitable levers for operating the rod 60 either by hand or foot, (not shown) or automatically.

The operation of the device may be briefly described as follows:—Referring first to Fig. 6, and assuming for example that the driving mechanism is applied to a heavy duty truck, the shaft 3 is driven from the engine 6 in the required direction, for example as to drive forward, it being understood that the mechanism for controlling the direction of driving the shaft 3 may be of any suitable form, the transmission gearing 8 being shown as illustrating means for varying the speed or direction of rotation of the shaft. It may be assumed first that the parts are all in the positions shown in the figures, so that the vehicle may be driven forward. The worm wheel 25 is driven through the worm gear 12 by the shaft 3, and the parts being in the positions shown, the members 44 being as shown in the full lines in Fig. 1. As the worm wheel rotates, the face 72 of the worm wheel insert 47 engages the face of the end 71 of the member 44, which is engaged at 70 with the insert 46. This is true of all of the members 44, so that the worm wheel drives the members 27 and 28 through the members 44. It will be noted that there is a positive pressure applied with no strain on the shafts or pins 45, the members acting as short struts, which owing to their small proportions, are of great strength. Driving the members 27 and 28 drives the pinions 35 of the differential gear, which are in mesh with the gears 40 and 41, which are keyed on the shaft parts or axles 1 and 2, and driving the axle 1, 2 drives the rear wheels. As is obvious, the differential gearing permits the outside wheel to travel faster than the inside wheel in turning, etc. As before mentioned, the shaft, consisting of the parts 1 and 2, may be connected directly to the wheels forming the axle, as shown, or connected thereto by intermediate connecting means. Assuming now that the shaft 60 is rotated so as to move the sleeve 56 enough to partially raise the fingers 53, in which case the members 44 are brought to neutral, or so that they will not be engaged on either side by the worm wheel, so that if the worm wheel is driven there will be no power transmitted to the axle. When in this position also the vehicle may be pushed or pulled in the garage in either direction, or wherever desired, or that is moved by outside power whenever desired. This is an important feature inasmuch as the worm wheel would be locked by the worm gear 12 when the engine or shaft 3 was not driven, if the worm wheel could not be disengaged from the shaft or axle so that it would be impossible to move the truck. To drive the vehicle in the reverse or rearward direction, the shaft 60 is further rotated to force the cams inward so as to raise or operate the fingers still further, throwing the members 44 into the positions shown in the dotted lines in Fig. 1. If then the shaft 3 is driven in the opposite direction, thereby reversing the direction of rotation of the worm wheel 25, the shaft or axle parts 1 and 2 will be driven in the opposite direction similar to the driving forward. It should be particulaly noted that when the members 44 are in position for driving ahead, should the worm wheel 25 be reversed by reversing the direction of rotation of the shaft 3, the members 44 would be turned or snapped backward by the worm wheel, as the inserts passed over each member without driving the axle, the result being the same as if the members 44 were at neutral positions. The same would be true if the vehicle was moved by outside power, the shaft 3 being stationary. By resiliently connecting or securing the fingers 53 on the shafts, or pins 45, the same result is brought about in case the members were set for reverse and the worm wheel was driven ahead, etc. If, in climbing the hill, the engine should die, the worm gearing and the pawls would prevent the vehicle from running away or backing down the hill, or if descending or going down the hill the engine should stop for any reason, the pawls would ratchet and the vehicle would coast under the control of the brakes. In this connection it will be seen that the connecting parts work automatically, either in going up or down hill, or when the vehicle is moving because of its momentum. In this sense the invention may be broadly described as a worm gear set for driving the axle, or driven shaft, means being provided for positively or automatically disconnecting the worm gear set from the axle.

It will thus be seen that by the employment of the worm gearing drive, a higher power is obtained, although of course the speed is somewhat lower. This, however, is not a defect or disadvantage, inasmuch as trucks to be most efficient should be designed more for a steady, heavy power than for a wide range of speed, including a high speed. With the constructions in use, in which trucks are constructed by using the regular driving mechanisms for touring cars, etc., perhaps of greater dimensions and changing the style of body, the temptation is great for the driver of the truck to run at high speed, particularly when empty or without a load. This is bad for a heavy truck, for the jolting on a rough road is very severe upon the working parts, and high speed is rarely necessary for regular work. With the mechanism shown and described, if for any reason its own power is inoperative, or not desired, it may be pulled or pushed about, the driving mechanism being disconnected from the axle, or inoperative as described. By the proper manipulation of the controlling mechanism the parts may be thrown so as to prevent movement of the vehicle when on an incline, that is the vehicle may be blocked by throwing the pawls in the proper direction when the engine is not running. As many other important advantages will be obvious to those familiar with the requirements of vehicles of the kind enumerated, or similar to them, it is therefore unnecessary to enumerate and particularly point out all of them.

Having thus described my invention, it is obvious that various immaterial modifications may be made in the same without departing from the spirit of my invention, hence I do not wish to be understood as limiting myself to the exact form, arrangement, construction or combination of parts herein shown and described, or uses mentioned.

What I claim as new and desire to secure by Letters Patent is:—

1. In a device of the kind described and in combination, a driving shaft, a worm gear driven thereby, a worm wheel in mesh with said worm gear, a driven shaft, and locking means positioned within the worm wheel for operatively connecting said worm wheel and driven shaft as desired.

2. In a device of the kind described and in combination, a driving shaft, a worm gear driven thereby, a worm wheel in mesh with said worm gear, a driven shaft, and means for operatively connecting said worm wheel and driven shaft as desired, comprising a plurality of pawl members positioned within the worm wheel, and means for operating said pawl members.

3. In a device of the kind described and in combination, a driving shaft, a worm gear driven thereby, a worm wheel in mesh with said worm gear, a supporting member for said worm wheel, a driven shaft, said worm wheel supporting member being mounted upon said shaft, and means carried by said support intermediate its sides for operatively connecting said worm wheel and its support.

4. A device of the kind described comprising a driving shaft, a worm gear thereon, a worm wheel in mesh with said worm gear, a driven shaft, a support for said worm wheel operatively mounted upon said driven shaft, and means for connecting said worm wheel and its support, comprising a plurality of pawl members arranged intermediate the sides of the worm wheel and adapted to engage the inner surface of the periphery thereof, and means for yieldingly controlling said pawl members.

5. A device of the kind described, comprising a driving shaft, a worm gear connected therewith, a driven shaft, a worm wheel mounted thereon in mesh with said gear, and clutching means interposed between opposite sides of the wheel for operatively connecting said worm wheel and the driven shaft as desired.

6. In a device of the kind described and in combination, a shaft and means for driving the same in the desired direction, a worm connected with said shaft, a gear in mesh with said worm, an axle and means including a movable member within the gear for operatively connecting the axle and gear when either is rotated in a predetermined direction relative to the other.

7. A device of the kind described, comprising a driving shaft, a worm gear connected therewith, a driven shaft, a worm wheel in mesh with said gear, a support for said worm wheel mounted upon said driven shaft, means for operatively connecting said support and worm wheel as desired, comprising engaging means positioned within the worm wheel carried by one part and arranged to engage the other part.

8. A device of the kind described, comprising a driving shaft a worm gear connected therewith, a driven shaft, a worm wheel in mesh with said gear, a support for said worm wheel mounted upon said driven shaft, means for operatively connecting said support and worm wheel as desired, comprising a plurality of pawls carried by one part and arranged to engage the other part, said parts constituting therebetween a housing for said pawls.

9. A device of the kind described, comprising a driving shaft, a worm gear connected therewith, a driven shaft, a worm wheel in mesh with said gear, oppositely disposed supporting members for said worm wheel mounted upon said driven shaft and extending laterally therefrom, means for operatively connecting said support and worm wheel, comprising a plurality of pawls arranged intermediate said supporting members carried by one part and arranged to engage the other part, and means for controlling said pawls.

10. A device of the kind described, comprising a driving shaft, a worm gear connected therewith, a two-part driven shaft, a worm wheel in mesh with said worm gear, a support for said worm wheel mounted upon said driven shaft, differential gearing connecting said worm wheel support and said driven shaft parts, and means for operatively connecting said wheel and its support, comprising a plurality of pawls carried by the support and arranged to directly engage the said wheel, and means for controlling said pawls.

11. A device of the kind described, comprising a driving shaft, a worm gear connected therewith, a two-part driven shaft, a worm wheel in mesh with said worm gear, a support for said worm wheel rotatably mounted upon said driven shaft, differential gearing connecting said worm wheel support and said driven shaft parts, comprising a gear for each shaft part secured thereto and a pinion carried by said support and in mesh with said gears, and a clutch carried by the support and directly engaging a fixed part of said worm wheel.

12. A device of the kind described comprising a driving shaft, a worm gear connected therewith, a two-part driven shaft, a worm wheel in mesh with said worm gear, a support for said worm wheel rotatably mounted upon said driven shaft, differential gearing connecting said worm wheel support and said driven shaft parts, and means for operatively connecting said worm wheel and its support, comprising a pawl carried by one part and within the worm wheel and arranged to engage a coöperating face on the other part, and means for controlling said pawl.

13. A device of the kind described, comprising a driving shaft, a worm gear connected therewith, a two-part driven shaft, a worm wheel in mesh with said worm gear, a support for said worm wheel mounted upon said driven shaft, differential gearing within the support connecting said worm wheel support and said driven shaft parts, a pawl carried by said support and arranged to directly engage a fixed part of said worm wheel, and means for controlling said pawl.

14. A device of the kind described comprising a driving shaft, a worm gear connected therewith, a two-part driven shaft, a worm wheel in mesh with said worm gear, a support for said worm wheel rotatably mounted upon said driven shaft parts, said support arranged to prevent transverse movement of the worm wheel, differential gearing connecting said worm wheel support and said driven shaft parts, a plurality of pawls intermediate the sides of said support and arranged to engage the worm wheel when rotated in either direction, and means for controlling said pawls whereby the same will engage the worm wheel when rotated in a predetermined direction, or maintain the same in a neutral position.

15. A device of the kind described comprising a driving worm gear, a two-part driven shaft and worm wheel in mesh with said worm gear, a support for said worm wheel loosely mounted upon said driven shaft, differential gearing connecting said worm wheel support and the driven shaft parts, and means positioned within the support for connecting the worm wheel and its support, said means comprising a plurality of double acting pawls, said worm wheel provided with a plurality of coöperating faces for each pawl, said pawls arranged to engage the worm wheel at one of said faces when the worm wheel is rotated in the desired direction, and means for controlling said pawls and yieldingly maintaining the same in engaging or neutral position.

16. In a device of the kind described and in combination, a worm, and means for driving the same in the desired direction, a gear in mesh with said worm, a shaft, a gear connection interposed between said gear and shaft, a pawl, and ratchet means interposed between the gear and said connection for operatively connecting said gear and shaft as desired, said means being connected to one of said parts.

17. In a device of the kind described and in combination, a gear and means for driving the same as desired, a shaft, a gear mounted upon said shaft and in mesh with said first mentioned gear, means for connecting said shaft and the gear mounted thereon comprising a plurality of pawls carried by one part arranged to engage the other part when either is rotated in a predetermined direction relative to the other, said pawls being positioned intermediate the sides of the wheel and surrounded by the periphery thereof, means for yieldingly maintaining the pawls in the desired operative position, and means for controlling said pawls.

In testimony whereof, I have hereunto signed my name in the presence of two subscribing witnesses.

ELMER D. BROTHERS.

Witnesses:
Roy W. Hill,
Charles I. Cobb.